April 4, 1961 J. A. NORTON 2,977,925
APPARATUS FOR MEASURING THE AMOUNT OF RADIOACTIVE
MATERIAL DEPOSITED ON ARTICLES
Filed Jan. 3, 1955 2 Sheets-Sheet 1
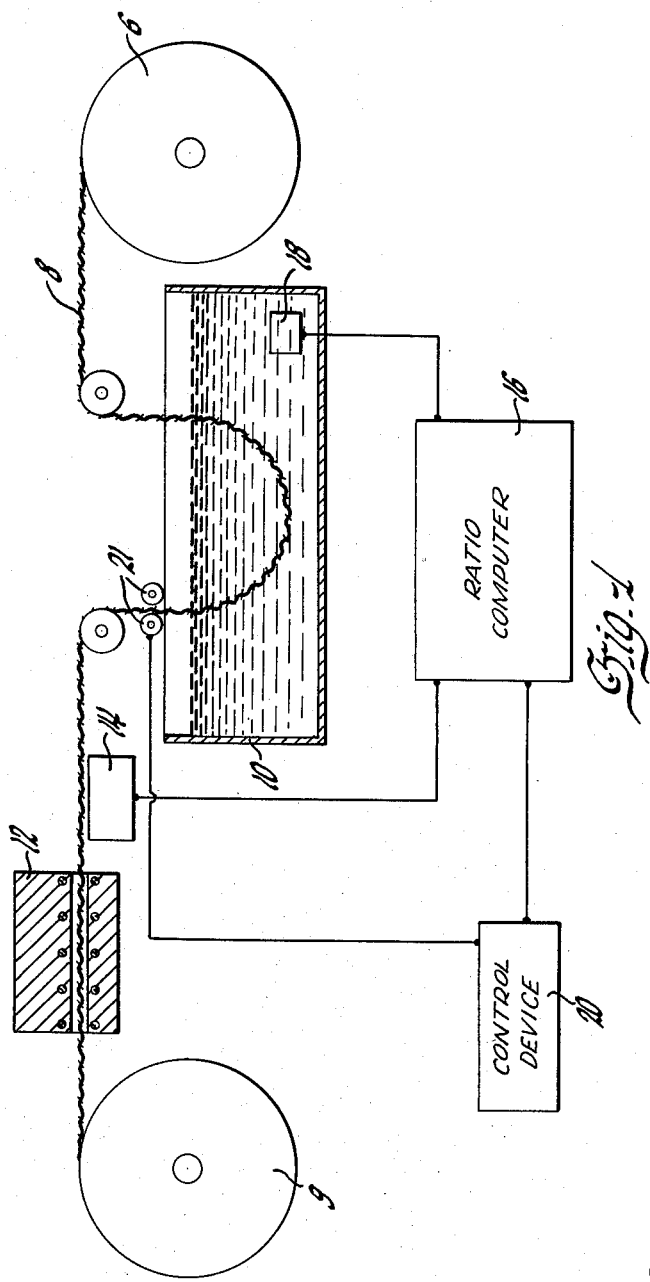
INVENTOR
James A. Norton
BY
J. E. Ross
ATTORNEY

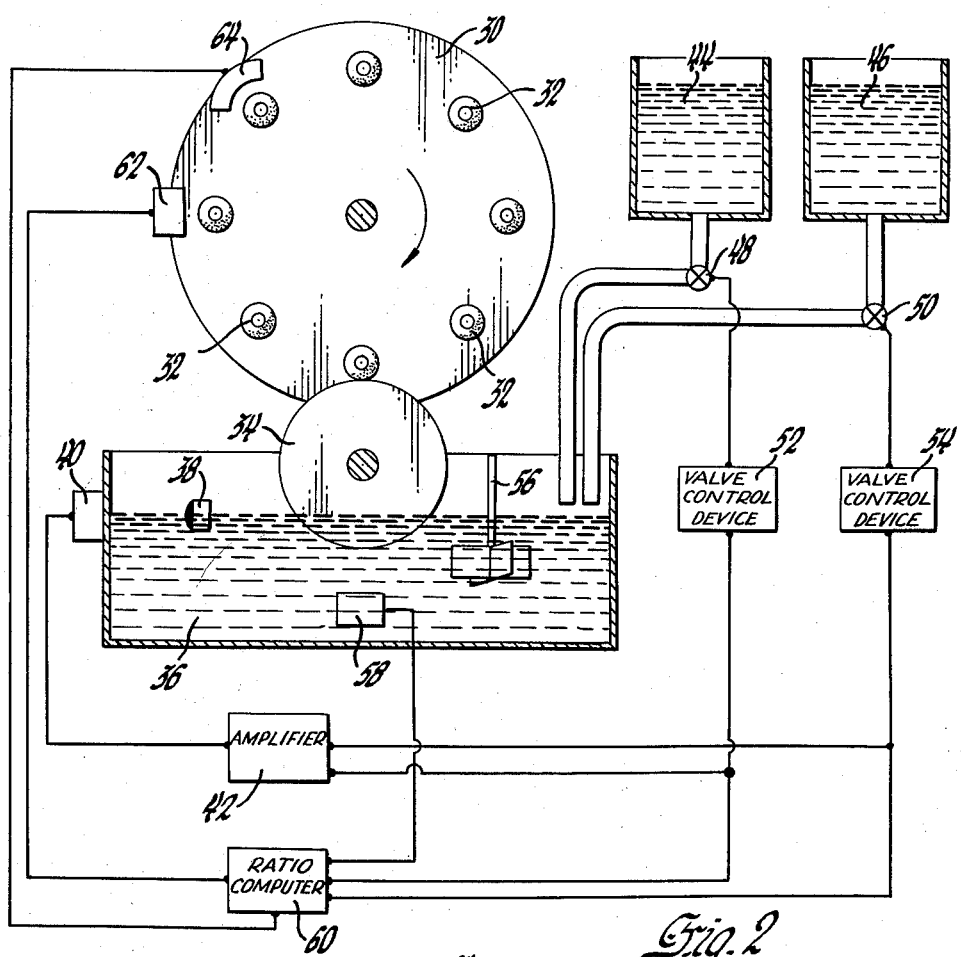

2,977,925
APPARATUS FOR MEASURING THE AMOUNT OF RADIOACTIVE MATERIAL DEPOSITED ON ARTICLES

James Allen Norton, Flint, Mich., assignor to General Motors Corporation, Detroit, Mich., a corporation of Delaware Filed Jan. 3, 1955, Ser. No. 479,417

7 Claims. (Cl. 118—8)

This invention relates in general to the measurement and control of coating thicknesses and more particularly to an improved method and apparatus for measuring and controlling coating thicknesses by the use of a radioactive tracer.

In recent years it has been proposed to measure the amount of one material deposited on another by including in the deposited material a fixed proportion of radioactive isotope prior to deposition, and then measuring the amount of radioactivity per unit area or volume of the finished article after deposition. For example, in the coating of wire or cloth, it has been proposed to incorporate into the coating material a certain amount of radioactive tracer prior to the coating operation. After the wire or cloth is coated, it is passed by a Geiger counter or similar device which measures the amount of radioactivity per unit area of the cloth or wire. The Geiger counter may be connected to a control mechanism which determines the speed of the wire or cloth through the coating bath and therefore the amount of coating material deposited. Thus, if the radioactivity count decreases, the speed of the cloth through the bath is caused to decrease by the control mechanism, thereby increasing the amount of coating material deposited on the cloth or wire. If the radioactivity count increases, the control mechanism causes the speed of the wire or cloth to increase, thereby reducing the amount of material deposited.

It is highly advantageous and in some instances essential that the radioactive isotope used in such operations be such as not to create a health hazard in the finished article. For example, in the above-described method for controlling the coating on wire, it would be highly disadvantageous to utilize the radiocative material which maintained its radioactivity for an extended period. If such material were used, the coated wire would create a health hazard and thus not be saleable. Of course, the wire could be stored until the radioactivity decreased to within safe limits; however, such storage would cause additional expense which might be prohibitive. In order to circumvent such difficulties, the radioactive material used should have a relatively short half-life so that its radioactivity is substantially dissipated within a short time after the manufacturing operations are completed.

The use of radioactive isotope with a short half-life, however, introduces a problem which does not exist in those instances where it is possible to use material having an extremely long half-life. That problem is this: When a short half-life material is used, the radioactivity count of the coating bath decreases so rapidly that the counting device is immediately out of calibration and thus inaccurate measurement and control results. Assume, for example, that a substance having a half-life of 12 hours is used. The counting device is calibrated in accordance with the radioactivity of the coating bath and also in accordance with the thickness of coating desired. However, because of the short half-life, the radioactivity count of the bath decreases so rapidly that the counting device is almost immediately out of calibration. Since the counter and control device are not calibrated in conformity with the bath radiocativity, the entire method fails to properly measure and control the coating thickness. Instead of remaining constant, the coating thickness will slowly increase, the extra thickness of coating material producing the same radioactivity count at the counting meter after only a few minutes have gone by as was produced by a much thinner coating when the bath was first formulated.

It is an object of the present invention to present a solution to the aforementioned problem, thereby providing a method and apparatus for measuring and controlling coating thicknesses and the like by the use of radioactive material which method and apparatus greatly reduces the radioactivity safety hazard and which greatly increases accuracy in such measurement and control. Another object of the present invention is the provision of a method and apparatus of the type and for the purposes described wherein the measurement and control of the amount of material deposited is constantly maintained accurate.

These objects are carried out in accordance with the invention by providing the measurement and control mechanism with a varying standard, said varying standard being the radioactivity count of the material to be deposited. In this manner, the amount of coating material applied is determined by the ratio of the radioactivity of the material after deposition to that of the material to be deposited. Since the ratio remains constant irrespective of variation in the radioactivity, the measurement and control of the coating thickness can likewise be maintained quite constant.

Other objects and advantages of the invention will appear more clearly from the following description of various embodiments and from the drawings in which:

Figure 1 is a schematic diagram illustrating the method and apparatus as applied to measuring and controlling the amount of impregnating and coating material applied to cloth for the manufacture of fuel pump diaphrams;

Figure 2 is a schematic diagram showing the invention as applied to measuring and controlling the amount of glazing material applied to spark plug insulators; and Figure 3 is a side view in partial section of a portion of the apparatus which may be used in the embodiment shown in Figure 2.

Referring now to these drawings, there is illustrated in Figure 1 an apparatus for measuring and controllably applying a coating and impregnating material to cloth. A driven reel 6 carries the cloth 8 which is fed by driving reel 9 through a bath 10 where it is coated, and then through heating ovens 12 which perform such drying and curing operations as may be necessary. The bath 10 includes a radioactive coating material or a non-radioactive coating material containing a small amount of radioactive isotope which is deposited therewith. After passage through the bath, the treated cloth is passed by a radioactivity counting device 14 which is connected to a ratio computer 16. Also connected to the ratio computer is a radioactivity counting device 18 located within or adjacent to the bath 10 to measure the radioactivity thereof. The ratio computer is connected to actuate a control device 20 which regulates the distance between rolls 21, doctor blades or the like through which the cloth passes thereby controlling the amount of coating material remaining on the cloth.

The counting device 14 is preferably located closely adjacent the bath 10 in order that there be the shortest possible time lag between the application of the coating material and the taking of the radioactivity count. It is also preferable to measure the radioactivity count over a rather large area of the cloth in order that small local variations in the count have as little effect as possible. In this last regard, it may be advantageous to include in the electrical circuit, some suitable damping means such as an inductance or capacity resistor to smooth out fluctuations caused by instantaneous variations in the radioactivity counts.

The radioactivity counting devices 14 and 18 may be the usual Geiger counters or scintillation counters. The latter are usually preferable because of their greater sensitivity. Ratio computer 16 may be any mechanism capable of constantly computing the ratio of the radioactivity count being fed to it by counter 14 to that count which is fed by counter 18 and including also some suitable means for signalling or actuating the control device 20 at any time the ratio varies from the predetermined ratio for which the mechanism is set. Such ratio computers are manufactured, for example, by the Industrial Nucleonics Corporation of Columbus, Ohio.

The operation of the apparatus shown in Figure 1 is as follows: Bath 10 is first formulated to include the coating material such, for example, as synthetic rubber latex or the like containing a small proportion of a radioactive isotope having a relatively short half-life. It is preferable that the radioactive isotope have a half-life of less than about 20 hours. Examples of such radioactive isotopes are Na 24 and K 42 which have half-lives of 14.9 and 12.5 hours respectively. A radioactivity count of the bath is taken and from this figure, along with the known concentration of the coating material in the bath, the radioactivity count which should be given by a coating of the desired thickness is computed. The ratio computer 16 is then set in accordance with the ratio between the radioactivity count to be desired of the finished cloth and the count of the bath. If desired, the computer may be set to maintain the ratio, and therefore the coating thickness, within certain limits rather than to maintain a single specific ratio. After the ratio computer is so calibrated or set, the cloth is passed through the bath 10 and the rolls 21, and then past the counting device 14 which signals the radioactivity count of the finished cloth to computer 16. At the same time, counter 18 within the bath signals its radioactivity count to the computer 16. If the ratio between these two counts is such as to be within the limits for which the computer is calibrated, no signal is sent by the computer to the control device 20. However, if the ratio is outside the limits set, the computer sends a signal to the control device 20 which increases or decreases the distance between the rolls 21 accordingly. For example, if the radioactivity count from 14 is lower than that required to maintain the ratio within the given limits, the computer 16 sends a signal to the control device 20 which causes said device to increase the distance between the rolls 21, thereby affecting a thicker deposit of coating material on the cloth. This thicker coating carries a greater amount of radioactive material per unit area and thus when such thicker coating reaches the counter 14, the ratio will immediately be brought within the limits set. On the other hand, if the radioactivity count originating at 14 is too high, the computer 16 signals the control device 20 to cause a decrease in the size of the gap between the rolls 21, thereby decreasing the coating thickness until the radioactivity count at 14 is brought within the limits required by the ratio set on the computer 16.

As the apparatus continues to operate, the radioactivity count of the bath 10 will decrease because of the dissipation of the radioactivity of the radioactive isotope therein. However, because the ratio of the counts from 14 and 18 determines the thickness of the coating, this decrease in the count received by the computer from 18 automatically decreases the limits for the count required from 14 in order to cause actuation of the control device 20.

Thus it will be seen that in accordance with the present invention there is provided a means for accurately measuring and controlling the amount of material deposited irrespective of the decrease in radioactivity of the isotope included in the formulation of the material to be deposited.

The present invention is not limited, of course, to the application of coatings or the like to continuous workpieces such, for example, as cloth or wire. It is applicable to any operation wherein one material is deposited on another in a continuing operation and the examples specifically set forth herein are given by way of illustration rather than by way of limitation.

By the term "successive articles" as used in the appended claims is meant both successive areas of a continuous work-piece such as cloth, wire or the like, and also, the areas of successive individual work-pieces.

Application of the invention to the continuous processing of successive individual work-pieces is shown in Figure 2 which graphically illustrates the process and apparatus as applied to measuring and controlling the thickness of glaze applied to spark plug insulators. An indexing turntable type work holder is shown at 30, insulators such as represented by 32 being suitably supported at spaced points around the circumference thereof. At 34 is represented a glaze application roller which dips into a bath 36 of the glaze material and rolls against the surface of the insulator to apply the glaze thereto. Thus, the turntable 32 indexes in the direction indicated bringing each successive insulator thereon in a position to be contacted by the glaze application roller, means being provided to rotate either the insulator or the glaze application roller so as to apply glaze to either selected portions or to all of the surface of the insulator.

In order to maintain the level of the bath 36, there is provided a light source 38 which cooperates with a photosensitive element 40 which actuates amplifier 42. Two tanks 44 and 46 are provided to replenish the bath 36, tank 44 containing radioactive glaze concentrate and tank 46 containing glaze diluent. The outlet pipes from these tanks leading to the bath 36 are provided with valves 48 and 50 which are controlled by valve regulating devices 52 and 54 respectively. These valve regulating devices are actuated by a signal from the amplifier 42. Thus, as soon as the level of the glaze in the bath 36 drops below the position of the light source 38, the photosensitive element 40 is actuated to give a signal to amplifier 42 which in turn actuates the valve control devices 52 and 54 to open valves 48 and 50 and thereby replenish the bath. It is understood, of course, that the valves 48 and 50 will be opened sufficiently to provide the proportions of glaze concentrate and glaze diluent desired in the bath 36. In order to assure a completely uniform mixture of the bath components, a mechanical stirrer 56 projects into the bath and may be maintained in constant operation.

Within or immediately adjacent to the glaze bath 36 is a radioactivity counting device 58 which feeds its signal into ratio computer 60. Another radioactivity counting device 62 is located adjacent to the turntable 30 to measure the radioactivity of each of the insulators after glazing, this counting device 62 also feeding its signal to ratio computer 60. The ratio computer 60 is connected to each of the valve regulating devices 52 and 54. Also, if desired, the ratio computer may be connected to actuate an insulator rejection device indicated at 64.

Operation of the device is as follows:

Glaze bath 36 is first formulated by the addition of the required amount of glaze concentrate plus glaze diluent, the concentrate containing a selected proportion of a radioactive isotope with short half-life such, for example, as Na 24 or K 42. The turntable 30 and glaze roller 34 cooperate to cause the insulators to successively come in contact with the glaze applicaton roller 34 for the coating operation. After any given insulator is coated, it is indexed or moved to a position in front of counting device 62 where its radioactivity is measured and signalled to the ratio computer 60. If the count from 62 is lower than that required to maintain the ratio within the limits previously determined and for which the ratio computer is set, said ratio computer actuates valve regulating device 52 thereby causing valve 48 to open and admit glaze concentrate from the tank 44 into the bath 36. Stirrer 56 operates to thoroughly distribute the glaze concentrate within the bath and thus the glaze picked up by roller 34 and applied to the insulators is subsequently more concentrated, thereby resulting in a thicker glaze coating. If the count from 62 is too high, ratio computer 60 actuates valve regulating device 54 to admit glaze diluent to the bath 36, thereby decreasing the thickness of the coating applied to the insulators. In any instance where the count from 62 is either too high or low, the ratio computer may be connected to actuate the insulator rejection device 64 so that when those insulators which gave the high or low count reach that station, they will automatically be rejected.

It is not necessary, of course, that the glaze be applied by means of a roller such as is indicated at 34. Instead, any other suitable means for applying a glaze might be used. Also, if desired, the ratio computer may be connected to control the volume of glaze applied to the insulator rather than to control its concentration. For example, if desired, the glaze may be sprayed on the insulators and the ratio computer connected to the spraying device so as to control the volume of glaze sprayed on the insulators, the concentration of a glaze being maintained constant.

It will be obvious from the above description that the process and apparatus described will continue to operate ad infinitum so long as tanks 44 and 46 are replenished and so long as the radioactivity of the bath 36 is replenished. Since the amount of glaze applied to the insulators is determined by the ratio between the radioactivity in the bath and that on any given insulator, it is obvious that the accuracy of the measurement and control of the glaze coating is not dependent upon a fixed radioactivity count in the bath. Thus, replenishment of the bath with radioactive material will not necessitate recalibration. Because uniform distribution is attained and maintained by stirrer 56, there will be a minimum lag time after such addition of radioactive material during which only a very few of the insulators may be rejected by the mechanism 64. Even such rejection of only a few pieces will not occur unless relatively drastic additions of the radioactive material are made.

In some instances, it is advantageous to not only measure and control the total amount of glaze or other coating material applied to an article, but also to measure and control the distribution of this material on the article. This may be expeditiously accomplished by passing the coated surface by a slit in a lead shield located in front of the counting device. Figure 3 illustrates such mechanism in conjunction with the glazing of a spark plug insulator. In the particular case shown, two different annular areas 70 and 72 of the insulator are provided with glaze coatings. After the coating operation, the insulator is indexed in front of two separate counting devices 74 and 76 separated by a lead shield 78, the latter being necessary to prevent the radiation from the top glaze area from being picked up by the bottom counter and vice versa. Between the counting devices 74 and 76 and the insulator is a lead shield 80 having two elongated vertical slits 82 and 84 aligned with counting devices 74 and 76 respectively. The insulator is slowly rotated by suitable turning mechanism 85 so that successive portions of the coated areas are brought in line with the slits and the counting devices. In any instance where there is too great a variation or the radioactivity count from any one portion is too great or too small, the ratio computer to which the counting devices are connected may be caused to actuate an ejection device to discard defective insulators.

It is to be understood that, although the invention has been described with specific reference to particular embodiments thereof, it is not to be so limited since changes and alterations therein may be made which are within the full intended scope of this invention as defined by the appended claims.

What is claimed is:

1. Apparatus for measuring the amount of a radioactive material deposited on an article comprising a container to hold the material to be deposited, means to deposit the material in said container on said article, a radioactivity counting device to measure the radioactivity of the material in said container as it is deposited, a radioactivity counting device to measure the radioactivity of the material immediately after it is deposited on the article and a computer operatively connected to said counting devices to compute the ratio between the radioactivity counts taken thereby.

2. Apparatus as set forth in claim 1 and including means operatively connected to the computer to automatically reject an article the radioactivity count of which is outside predetermined limits after the radioactive material has been deposited thereon.

3. Apparatus for measuring and controlling the amount of a radio-active material deposited on successive articles comprising a container to hold the material to be deposited, means to deposit the material in said container on said article, a radioactivity counting device to measure the radioactivity of the material in said container as it is deposited, a radioactivity counting device to measure the radioactivity of the material immediately after it is deposited on the article, a computer operatively connected to said counting devices to compute the ratio between the radio-activity counts taken thereby and means operatively connected to said computer to control the amount of material deposited on succeeding articles.

4. Apparatus for depositing a predetermined amount of a radioactive material on successive articles comprising a container to hold the material to be deposited, means for moving the article through said container to deposit the material thereon, a radioactivity counting device to measure the radioactivity of the material in said container as it is deposited, a radioactivity counting device to measure the radioactivity of the material immediately after it is deposited on the article, a computer operatively connected to said counting devices to compute the ratio between the radioactivity counts taken thereby and means operatively connected to said computer to control the amount of material deposited on succeeding articles.

5. Apparatus for depositing a predetermined amount of a radioactive material on an article comprising a container to hold the material to be deposited, means for adding diluent to said container, means to deposit the material in said container on said article, a radioactivity counting device to measure the radioactivity of the material in said container as it is deposited, a radioactivity counting device to measure the radioactivity of the material immediately after it is deposited on the article, a computer operatively connected to said counting devices to compute the ratio between the radioactivity counts taken thereby and means operatively connected to said computer and to said first-mentioned means to control the concentration of diluent in said container.

6. Apparatus for coating a predetermined amount of a radioactive glaze material on a ceramic article comprising a container to hold the glaze material to be deposited, means to add liquid diluent and glaze material to said container, a stirrer in said container to form said glaze material and diluent into a uniform liquid mixture, means to deposit said mixture on the ceramic article, a radioactivity counting device to measure the radioactivity of the material in said container as it is deposited, a radioactivity counting device to measure the radioactivity of the material immediately after it is deposited on the ceramic article, a computer operatively connected to said counting devices to compute the ratio between the radioactivity counts taken thereby and means operatively connected to said computer and to said first-mentioned means to control the concentration of glaze material and diluent in said container.

7. Apparatus as set forth in claim 6 and including means for measuring the level of the liquid mixture in said container and means connected thereto to add glaze material and diluent to said container when the level falls below a predetermined point.

References Cited in the file of this patent

UNITED STATES PATENTS 2,640,788     Rockett _____ June 2, 1953

OTHER REFERENCES

Dall: "Tagged Atoms," Textile World, vol. 98, No. 12, December 1948, pp. 103 to 108.

Schreiber: "Radioisotopes for Industry," Electronics, January 1949, pp. 90 to 95.

Kramer: "Radioactive Isotopes as Tracers," Power Plant Engineering, November 1947, pp. 105 to 108.